US011105650B2

(12) United States Patent
Nakanishi et al.

(10) Patent No.: US 11,105,650 B2
(45) Date of Patent: Aug. 31, 2021

(54) INFORMATION PROCESSING APPARATUS, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Akihiko Nakanishi, Nisshin (JP); Daigo Fujii, Tsushima (JP); Makoto Tanaka, Toyota (JP); Kazuki Takeuchi, Toyota (JP); Chie Koike, Nagoya (JP); Daiki Kaneichi, Nisshin (JP); Tsuyoshi Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 16/455,871

(22) Filed: Jun. 28, 2019

(65) Prior Publication Data
US 2020/0011697 A1    Jan. 9, 2020

(30) Foreign Application Priority Data
Jul. 6, 2018    (JP) .............................. JP2018-129077

(51) Int. Cl.
*G01C 21/36* (2006.01)
*G01C 21/34* (2006.01)

(52) U.S. Cl.
CPC ....... *G01C 21/3661* (2013.01); *G01C 21/343* (2013.01); *G01C 21/3415* (2013.01)

(58) Field of Classification Search
CPC ............ G01C 21/3661; G01C 21/3415; G01C 21/343
See application file for complete search history.

(56) References Cited

U.S. PATENT DOCUMENTS

| 10,008,101 | B2 * | 6/2018 | Zhang ..................... H04W 4/90 |
| 2014/0139330 | A1 * | 5/2014 | Kleinstuck ............ B60R 25/102 |
| | | | 340/426.19 |

FOREIGN PATENT DOCUMENTS

| JP | 2005182146 A | * | 7/2005 |
| JP | 2011-237842 A | | 11/2011 |

OTHER PUBLICATIONS

English Translation of Foreign Reference JP-2005182146-A.*

* cited by examiner

*Primary Examiner* — Rami Khatib
*Assistant Examiner* — Shahira Baajour
(74) *Attorney, Agent, or Firm* — Oliff PLC

(57) ABSTRACT

An information processing apparatus of the present disclosure in a mode in which a plurality of users share the same vehicle sets, when determining a combination of a driving user and fellow users, a scheduled traveling route which is a scheduled route along which the vehicle travels from a getting-in spot to a getting-off spot of each of the fellow users. Upon detecting that the vehicle is traveling off a scheduled traveling route while the fellow users are in the vehicle, the information processing apparatus transmits warning information which is information warning a first user terminal of the driving user and a second user terminal of the fellow user that the vehicle is traveling off the scheduled traveling route.

7 Claims, 12 Drawing Sheets

[Fig. 1]
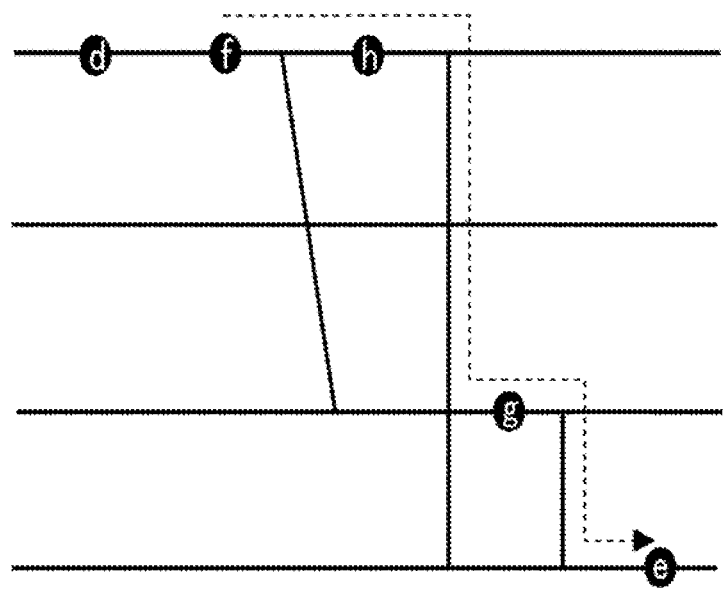

[Fig. 2]
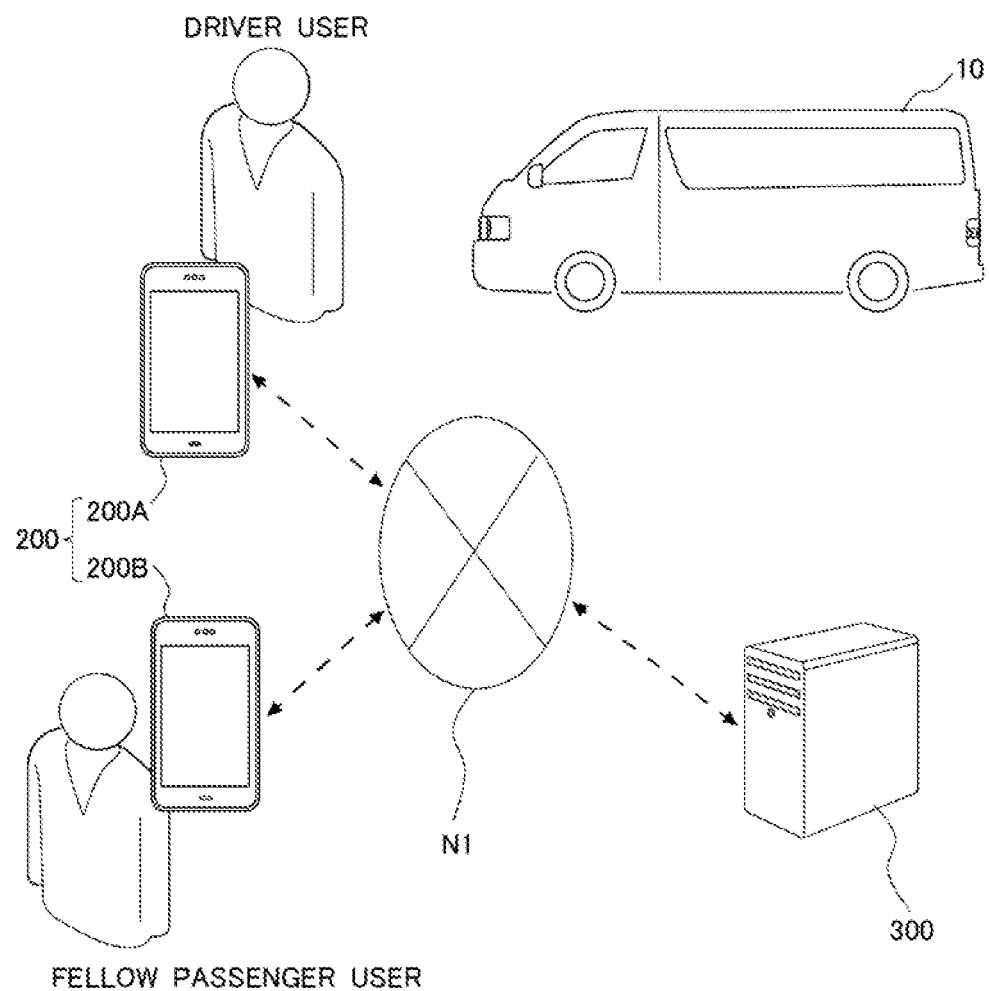

[Fig. 3]
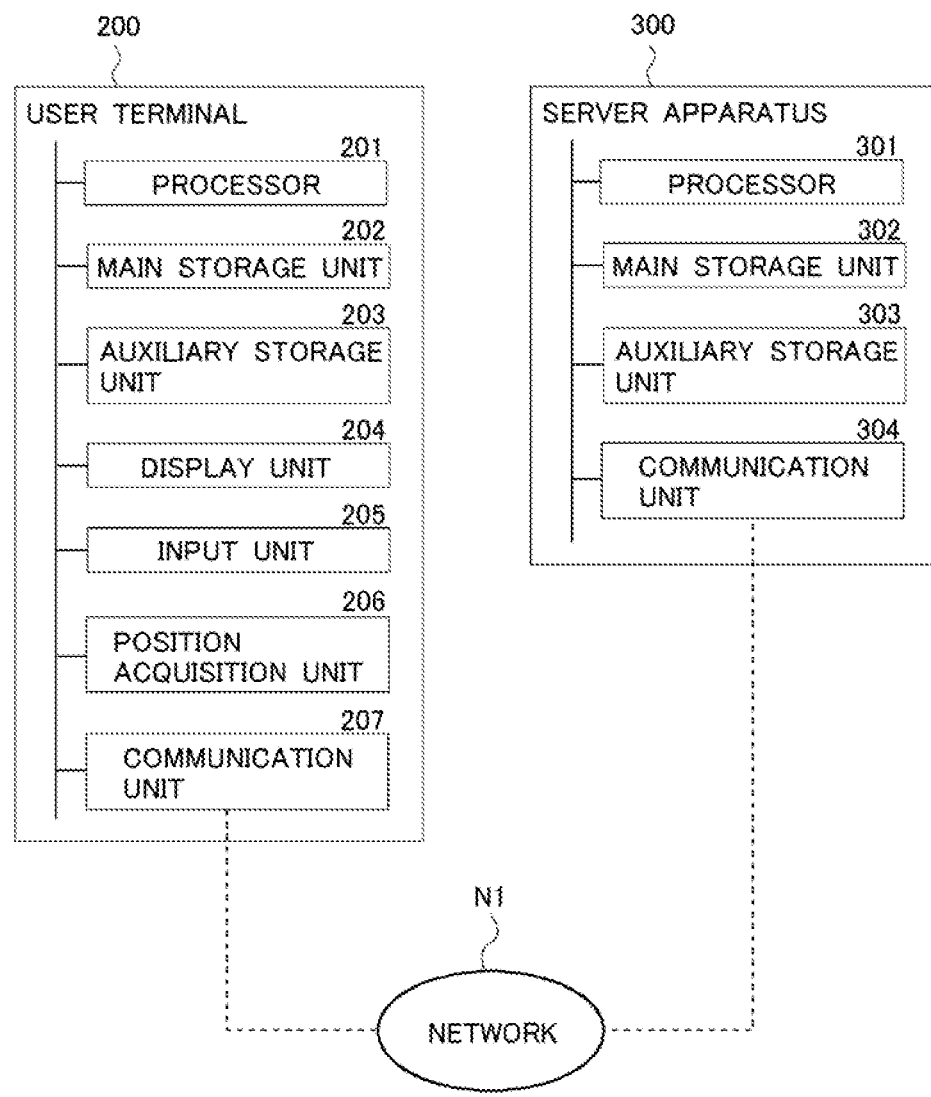

[Fig. 4]
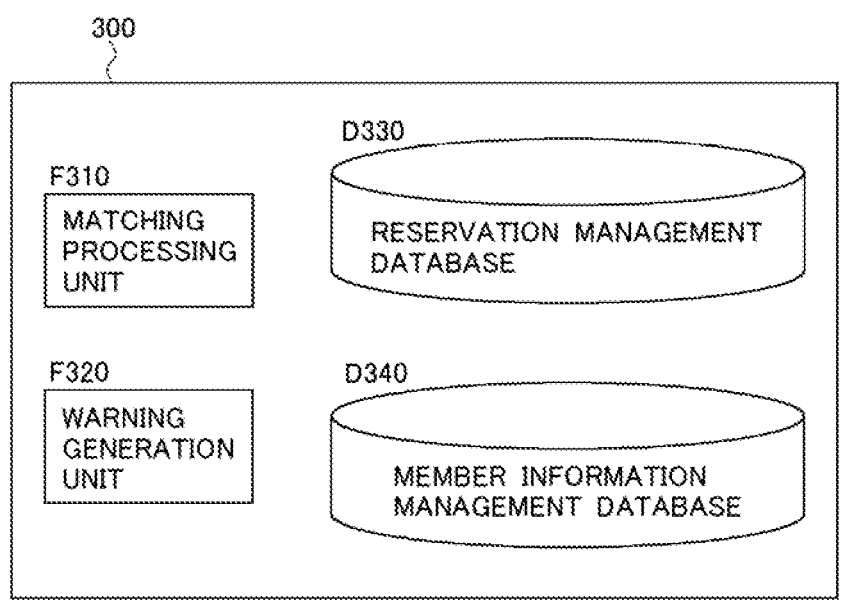

[FIG. 5]

| RESERVATION ID | DRIVER USER ID | VEHICLE INFORMATION | FELLOW PASSENGER USER ID | GETTING-ON SPOT | SCHEDULED GETTING-ON DAY AND TIME | GETTING-OFF SPOT | SCHEDULED GETTING-OFF DAY AND TIME | SCHEDULED TRAVELING ROUTE | STATUS |
|---|---|---|---|---|---|---|---|---|---|
| ... | D001 | ... | D010 | ... | 2018/11/01/1000 | ... | 2018/11/01/1300 | ... | GOT OFF |
| ... | D002 | ... | D020 | ... | 2018/11/05/0800 | ... | 2018/11/05/0800 | ... | ON BOARD |
| ... | D003 | ... | D030 | ... | 2018/11/08/1000 | ... | 2018/11/08/1800 | ... | BEFORE RIDING |

[FIG. 6]

| RESERVATION ID | DRIVER USER ID | VEHICLE INFORMATION | FELLOW PASSENGER USER ID | GETTING-ON SPOT | SCHEDULED GETTING-ON DAY AND TIME | GETTING-OFF SPOT | SCHEDULED GETTING-OFF DAY AND TIME | SCHEDULED TRAVELING ROUTE | STATUS |
|---|---|---|---|---|---|---|---|---|---|
| ... | D001 | ... | D010 | ... | 2018/11/01/1000 | ... | 2018/11/01/1300 | ... | ON BOARD |
| | | | D020 | ... | 2018/11/01/1030 | ... | 2018/11/01/1230 | ... | GOT OFF |
| | | | D030 | ... | 2018/11/01/1100 | ... | 2018/11/01/1530 | ... | ON BOARD |

[Fig. 7]
| USER ID | CONTACT ADDRESS | ATTRIBUTE | AUTHENTICATION | VEHICLE ID |
|---|---|---|---|---|
| D001 | ... | ... | ... | S001 |
| D002 | ... | ... | ... | S002 |
| D010 | ... | ... | ... | NONE |
[Fig. 8]
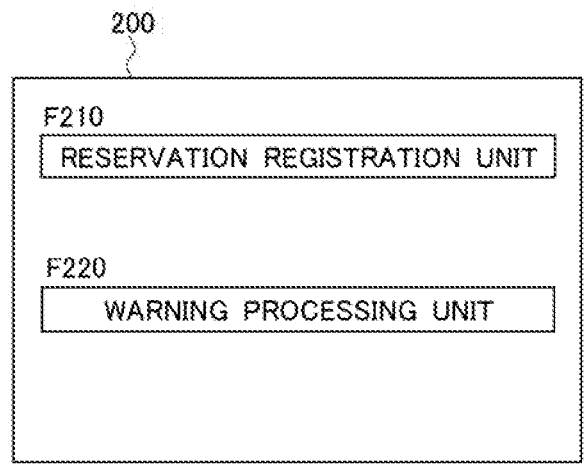

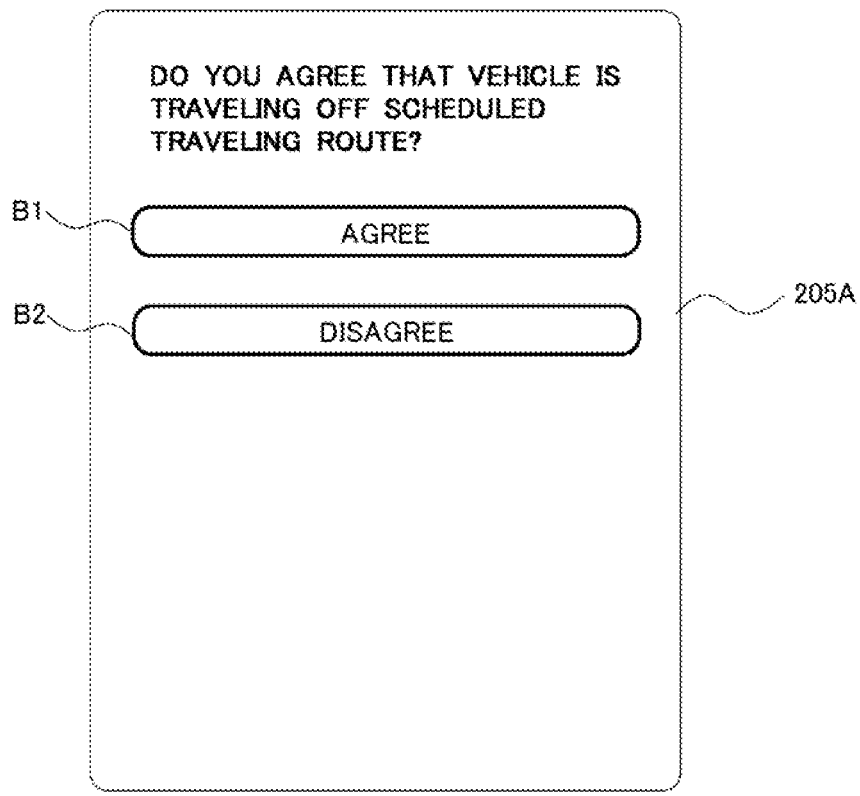
[Fig. 9]

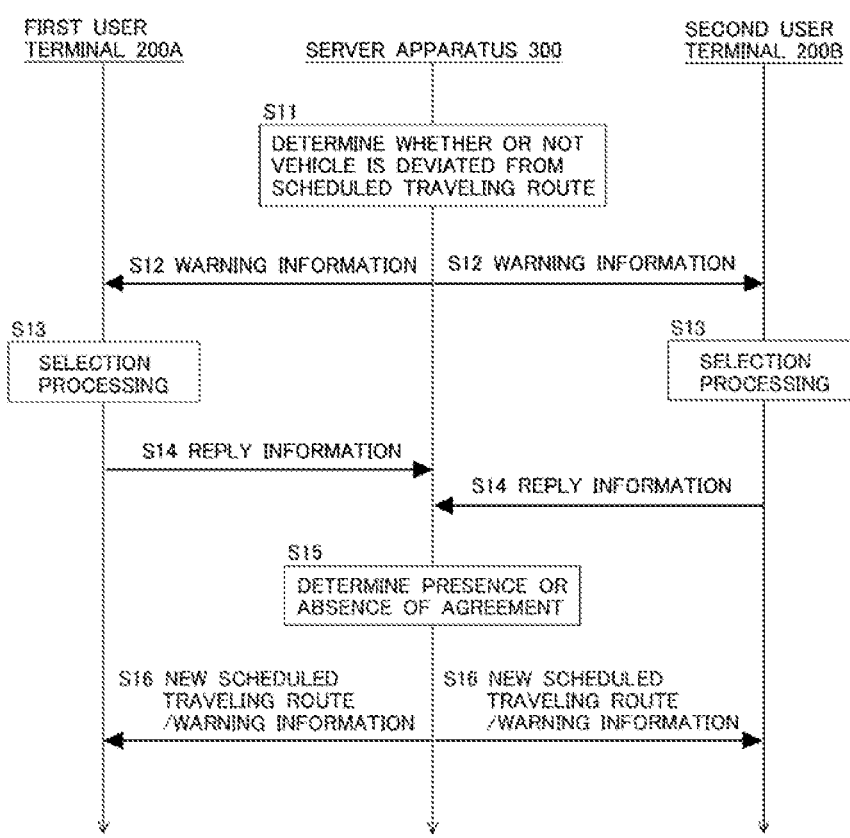
[Fig. 10]

[Fig. 11]
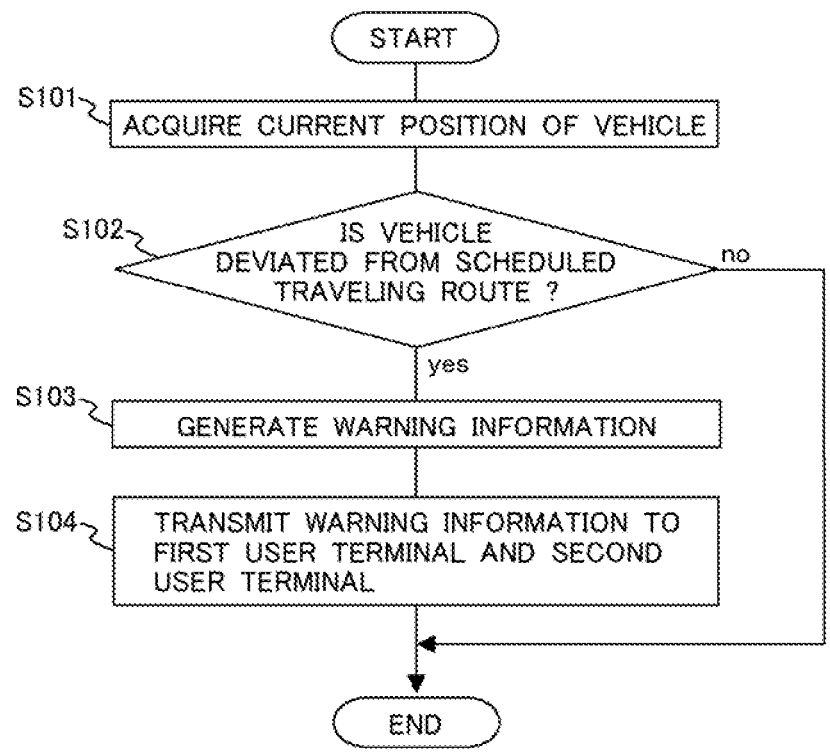

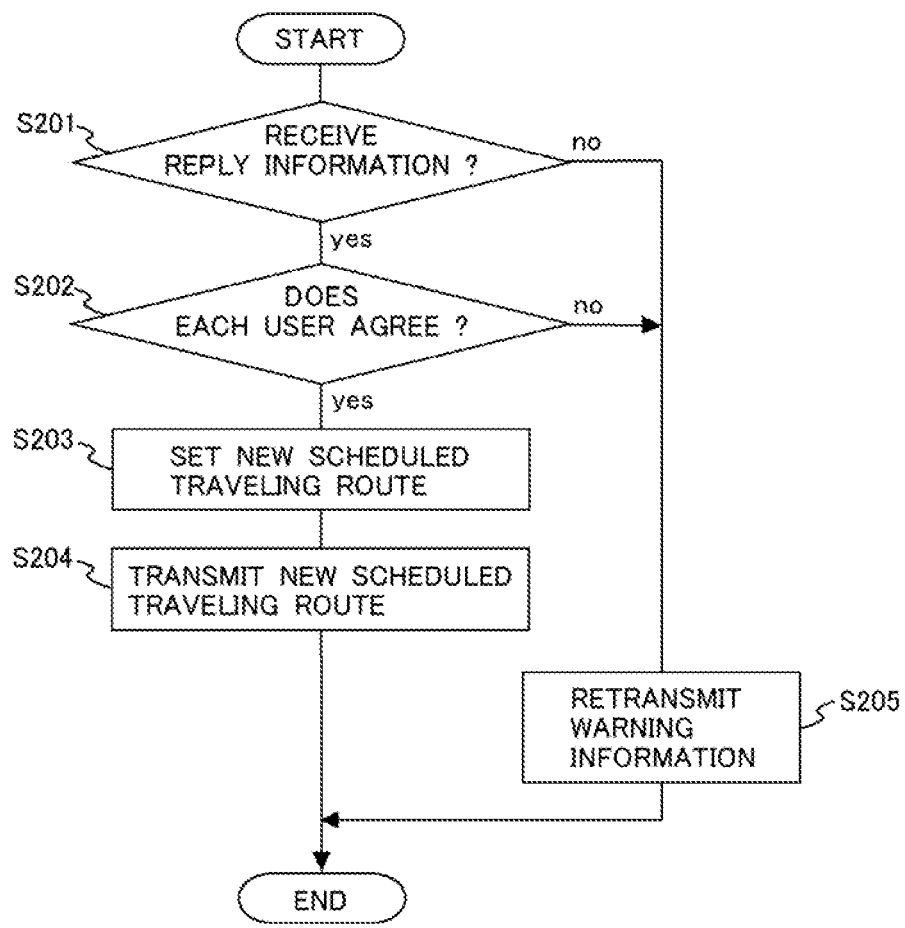
[Fig. 12]

[Fig. 13]
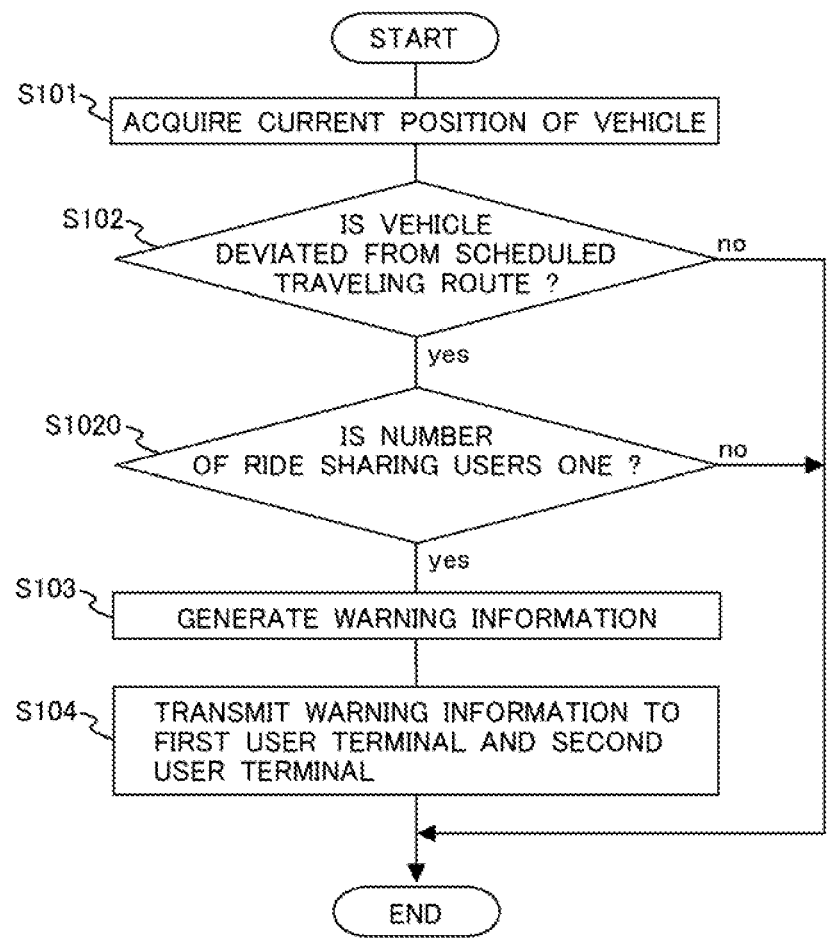

INFORMATION PROCESSING APPARATUS, INFORMATION PROCESSING METHOD AND NON-TRANSITORY STORAGE MEDIUM

CROSS-REFERENCE TO RELATED APPLICATIONS

This application claims the benefit of Japanese Patent Application No. 2018-129077, filed on. Jul. 6, 2018 which is hereby incorporated by reference herein in its entirety.

BACKGROUND

Technical Field

The present disclosure relates to an information processing apparatus, an information processing method and a non-transitory storage medium.

Description of the Related Art

Techniques for determining whether or not owners of terminals are sharing the same vehicle based on position information of the respective terminals and calculating environment loads such as $CO_2$ emission and fuel consumption based on the determination result are known (e.g., patent literature 1).

CITATION LIST

Patent Literature

Patent Literature 1: Japanese Patent Application Laid-Open No. 2011-237842

SUMMARY

It is an object of the present disclosure to provide a technique capable of contributing, in ride sharing for a plurality of users to share the same vehicle for traveling, to relief of anxiety of the users when using the ride sharing.

An information processing apparatus according to the present disclosure in a mode in which a plurality of users share the same vehicle is provided with a controller including at least one processor. The controller is configured to execute: setting, when a combination of a driving user who drives the vehicle and fellow users who ride in the same vehicle is determined, a scheduled traveling route, which is a route along which the vehicle is scheduled to travel from a getting-in spot to a getting-off spot of each of the fellow users; and transmitting, upon detecting that the vehicle is traveling off the scheduled traveling route, warning information which is information warning a first user terminal and a second user terminal that the vehicle is traveling off the scheduled traveling route, the first user terminal being a terminal used by the driving user and the second user terminal being a terminal used by the fellow user.

Furthermore, the present disclosure can also be comprehended as an information processing method. In that case, the information processing method according to the present disclosure in a mode in which a plurality of users share the same vehicle may be made to cause a computer to execute: a step of setting, when a combination of a driving user who drives the vehicle and fellow users who ride in the same vehicle is determined, a scheduled traveling route, which is a route along which the vehicle is scheduled to travel from a getting-in spot to a getting-off spot of each of the fellow users; and a step of transmitting, upon detecting that the vehicle is traveling off the scheduled traveling route, warning information which is information warning a first user terminal and a second user terminal that the vehicle is traveling off the scheduled traveling route, the first user terminal being a terminal used by the driving user and the second user terminal being a terminal used by the fellow user.

Furthermore, the present disclosure can also be comprehended as an information processing program or a non-transitory storage medium stored with the information processing program. In that case, the information processing program according to the present disclosure in a mode in which a plurality of users share the same vehicle may be configured to make to cause a computer to execute: a step of setting, when a combination of a driving user who drives the vehicle and fellow users who ride in the same vehicle is determined, a scheduled traveling route, which is a route along Which the vehicle is scheduled to travel from a getting-in spot to a getting-off spot of each of the fellow users; and a step of transmitting, upon detecting that the vehicle is traveling off the scheduled traveling route, warning information which is information warning a first user terminal and a second user terminal that the vehicle is traveling off the scheduled traveling route, the first user terminal being a terminal used by the driving user and the second user terminal being a terminal used by the fellow user.

According to the present disclosure, it is possible to contribute, in ride sharing whereby a plurality of users share the same vehicle for traveling, to relief of anxiety of the users when using the ride sharing.

BRIEF DESCRIPTION OF DRAWINGS

FIG. 1 is a diagram for describing an overview of ride-sharing;

FIG. 2 is a diagram illustrating a schematic configuration of a ride-sharing system;

FIG. 3 is a diagram illustrating a hardware configuration of a user terminal and a server apparatus;

FIG. 4 is a block diagram illustrating a functional configuration of the server apparatus;

FIG. 5 is a diagram illustrating a configuration on example of a reservation information table;

FIG. 6 is a diagram illustrating another configuration example of the reservation information table;

FIG. 7 is a diagram illustrating a configuration example of a member information table;

FIG. 8 is a block diagram illustrating a functional configuration of a user terminal;

FIG. 9 is a diagram illustrating an example of a screen for urging a user to select whether or not to agree that the vehicle is traveling off a scheduled traveling route;

FIG. 10 is a flow diagram illustrating an outline of a flow of data transmitted/received between respective components of a ride sharing system and a flow of processing executed by the respective components when the vehicle deviates from the scheduled traveling route;

FIG. 11 is a flowchart illustrating operation of the server apparatus when a vehicle in a ride-sharing mode is traveling;

FIG. 12 is a flowchart illustrating operation of the server apparatus after warning information is transmitted; and FIG. 13 is a flowchart illustrating operation of the server apparatus according to a modification when a vehicle in a ride-sharing mode is traveling.

DESCRIPTION OF EMBODIMENTS

The present disclosure is an information processing apparatus in a mode in which a plurality of users share the same vehicle (ride sharing) for exchanging various kinds of information with user terminals used by the respective users. Here, when using ride sharing, a user may hesitate to use ride sharing by feeling anxiety about a possibility that the user may be compelled to travel to a place different from a destination desired by the user.

To solve this problem, as for the information processing apparatus according to the present disclosure in a mode in which a plurality of users share the same vehicle, when a combination of a driving user who drives the vehicle and a fellow user who is a user sharing the vehicle is determined, a controller sets a scheduled traveling route which is a route along which the vehicle is scheduled to travel from a getting-in spot to a getting-off spot of each of the fellow user. When the fellow user is in the vehicle if it is detected that the vehicle is traveling off the scheduled traveling route, the controller transmits warning information which is information warning a first user terminal and a second user terminal that the vehicle is traveling off the scheduled traveling route, the first user terminal being a terminal used by the driving user and the second user terminal being a terminal used by the fellow user. It is thereby possible to warn both the driving user and the fellow user that the vehicle is traveling off the scheduled traveling route, and contribute to securing of safety of the users even when one of the driving user and the fellow user is compelled by the other, resulting in the vehicle traveling off the scheduled route. Thus, it is possible to relieve anxiety of the users who hesitate to use ride sharing from the standpoint of safety.

Note that upon detecting that the vehicle is traveling off the scheduled traveling route, the controller may transmit the warning information to the first user terminal and the second user terminal on condition that one fellow user is in the vehicle. This is because in a situation in which one fellow user is in the vehicle, the user is more likely to feel anxiety about safety than in a situation in which a plurality of fellow users are in the vehicle.

The warning information may also include information asking whether or not to agree that the vehicle is traveling off the scheduled traveling route. Upon receiving information indicating an agreement that the vehicle is traveling off the scheduled traveling route from both the first user terminal and the second user terminal, the controller may reset a new scheduled traveling route including the route along which the vehicle is actually traveling and transmit the reset scheduled traveling route to the first user terminal and the second user terminal. Here, the case where the vehicle travels off the scheduled traveling route may include a case where the vehicle travels off the scheduled traveling route after both the driving user and the fellow user agree with the deviation, for example, for the purpose of avoiding congestion. Therefore, in the case where the vehicle travels off the scheduled traveling route after both the driving user and the fellow user agree with the deviation, the scheduled traveling route may be changed to prevent excessive warning. It is thereby possible to prevent the driving user and the fellow user from feeling troublesomeness.

Hereinafter, specific embodiments of the present disclosure will be described based on the accompanying drawings. Dimensions, materials, shapes, and other relative arrangements or the like of components described in the present embodiments are not intended to limit the technical scope of the present disclosure to those embodiments unless specified otherwise.

Embodiment

An example will be described in the present embodiment where the present disclosure is implemented in a mode in which a plurality of users intended for traveling share the same vehicle (hereinafter referred to as "ride-sharing"). Note that automobiles and trains or the like can be used as vehicles that can be shared among a plurality of users for a traveling purpose. A case will be described in the present embodiment where an automobile is used as an example of such vehicles.

(Overview of Ride-Sharing)

First, an overview of ride-sharing will be described based on FIG. 1. In an example shown in FIG. 1, suppose that a user A travels from a starting point d to a destination point e, a user B travels from a starting point f to a destination point g and a user C travels from a starting point h to the destination point e.

Here, if the users A to C travel separately in their respective vehicles, three vehicles are necessary. In contrast, if the users A to C share the same vehicle, the users A to C can travel to their respective destinations in one vehicle. In the example shown in FIG. 1, the user A himself/herself drives a vehicle and travels from the point d to the point e. At this time, the user A allows the user B to get in the vehicle driven by the user A at the point f, and allows the user C to get in the vehicle driven by the user A at the point h. On the way to the point e which is the destination of the user A and the user C, the user A travels via the point g, where the user B gets off the vehicle, thus allowing the user g, to travel from the starting point f to the destination point g. After that, the user A drives the vehicle from the point g to the point e to thereby allow the user C to travel from the starting point h to the destination point e, and at the same time the user A himself/herself can attain the traveling of the user A.

Such ride-sharing can reduce the number of vehicles traveling on a road, and can thereby relax traffic jam. Furthermore, since a plurality of users who share the same vehicle share transportation expenses (fuel expenses or the like) necessary for traveling in the vehicle, it is possible to cut down on a transportation cost per user compared to a case where each user travels in an individual vehicle.

Note that the aspect of ride-sharing shown in FIG. 1 is merely an example, and combinations of users who share one vehicle can be determined using well-known techniques.

In the above-described ride sharing, a route from the place of departure f (getting-in spot) of the user B (fellow user) who is first to get in the vehicle driven by the user A (driving user) to the destination e (getting-off spot) of the user C (fellow user) who is last to get off the vehicle (a route illustrated by a broken line arrow in FIG. 1) is set as a scheduled traveling route. By the way, the actual traveling route of the vehicle may deviate from the above-described scheduled traveling route. In such a case, the vehicle may deviate from the scheduled traveling route at the driving user's discretion or the vehicle may deviate from the scheduled traveling route because the driving user is compelled by the fellow user. That is, the vehicle may deviate from the scheduled traveling route without any agreement between both the driving user and the fellow user. Unless some countermeasures are taken for such a situation, the users may feel anxiety about safety and hesitate to use ride sharing.

In contrast, according to the present embodiment, when the vehicle deviates from the scheduled traveling route, the server apparatus for executing information processing associated with operation and management of the ride sharing service transmits warning information warning both the user terminal (first user terminal) used by the driving user and the user terminal (second user terminal) used by the fellow user, that the vehicle is traveling off the scheduled traveling route.

(System Configuration)

FIG. 2 is a diagram illustrating a configuration example of a system for providing a ride-sharing service (hereinafter may also be referred to as a "ride-sharing system"). In the example shown in FIG. 2, the ride-sharing system is constructed of a vehicle 10 used for ride sharing, a user terminal 200 used by a user sharing the vehicle 10 and a server apparatus 300. The user terminal 200 and the server apparatus 300 are mutually connectable via a network N1. A WAN (Wide Area Network) which is a worldwide public communication network such as the Internet or other communication networks may be adopted for the network N1. The network N1 may include a telephone communication network such as mobile phones or a wireless communication network such as WiFi.

Note that although only one vehicle 10 is illustrated in the example shown in FIG. 2 as the vehicle available for the ride-sharing service, suppose that the ride-sharing system includes a number of vehicles registered as vehicles available for the ride-sharing service. In the example shown in FIG. 2, only two terminals: a first user terminal 200A used by a driver user and a second user terminal 200B used by a fellow passenger user are illustrated as user terminals 200, but suppose that the ride-sharing system includes a number of user terminals corresponding to the number of users registered as members entitled to use the ride-sharing service.

A predetermined application for using a ride-sharing service is installed in the user terminal 200. The user of the user terminal 200 causes the own user terminal 200 to execute the above predetermined application, and can thereby register information relating to conditions or the like when sharing a vehicle (hereinafter may also be referred to as "request information") in the server apparatus 300. For example, the driver user causes the first user terminal 200A to execute the above predetermined application, and can thereby register information relating to their own planned traveling period and traveling date and time or the like in the vehicle 10 in the server apparatus 300 as request information. On the other hand, the fellow passenger user causes the second user terminal 200B to execute the above predetermined application, and can thereby register information relating to their own desired ride sharing period and ride sharing date and time or the like in the server apparatus 300 as request information. Note that details of the user terminal 200 will be described later.

The server apparatus 300 receives the request information from the driver user and the request information from the fellow passenger user. The server apparatus 300 determines a provisional combination of a driver user and a fellow passenger user based on the request information from the driver user and the request information from the fellow passenger user. The server apparatus 300 transmits information indicating ride sharing conditions to the user terminals 200 of the driver user and the fellow passenger user in the above provisional combination. When the server apparatus 300 receives information accepting the ride sharing conditions from the respective user terminals 200 of the driver user and the fellow passenger user, the server apparatus 300 confirms the above provisional combination as an official combination. Hereinafter, a process for the server apparatus 300 to confirm a combination of a driver user and a fellow passenger user using the above procedure will be referred to as a "matching process."

Furthermore, the server apparatus 300 of the present embodiment is provided with, in addition to the function of performing the above-described matching processing, a function of setting a scheduled traveling route along which the vehicle 10 is scheduled to travel from the getting-in spot to the getting-off spot of the fellow user, and a function of transmitting, when the actual traveling route of the vehicle 10 is deviated from the scheduled traveling route, warning information to the first user terminal 200A and the second user terminal 200B. The server apparatus 300 that has these functions corresponds to an "information processing apparatus" according to the present disclosure.

(Hardware Configuration)

FIG. 3 is a diagram illustrating a hardware configuration of each of the user terminal 200 and the server apparatus 300. Note that the first user terminal 200A and the second user terminal 200B shown in aforementioned FIG. 2 each have a hardware configuration similar to the configuration of the user terminal 200 in FIG. 3.

The server apparatus 300 has a configuration of a general computer. That is, the server apparatus 300 includes a processor 301, a main storage unit 302, an auxiliary storage unit 303 and a communication unit 304. These components are mutually connected via a bus. The main storage unit 302 and the auxiliary storage unit 303 are computer-readable storage media. The hardware configuration of the computer is not limited to the configuration example shown in FIG. 3, but components may be omitted, replaced or added as appropriate.

The Server apparatus 300 implements functions matching to a predetermined object by the processor 301 loading a work region of the main storage unit 302 with a program stored in the storage medium and executing the program, and controlling the respective function components through execution of the program.

The processor 301 is, for example, a CPU (Central Processing Unit) or a DSP (Digital Signal Processor). The processor 301 controls the server apparatus 300 and performs operations of various kinds of information processing. The main storage unit 302 includes, for example, a RAM (Random Access Memory) and a ROM (Read Only Memory). The auxiliary storage unit 303 is, for example, an EPROM (Erasable Programmable ROM) or a hard disk drive (HDD). Furthermore, the auxiliary storage unit 303 can include a removable medium, that is, a removable storage medium. The removable medium is a disk storage medium such as a USB (Universal Serial Bus) memory, a CD (Compact Disc) or a DVD (Digital Versatile Disc).

The auxiliary storage unit 303 stores various programs, various kinds of data and various tables in a storage medium in a freely readable/writable state. The auxiliary storage unit 303 stores an operating system (OS), various programs and various tables or the like. Note that a part or a whole of these pieces of information may also be stored in the main storage unit 302, Information stored in the main storage unit 302 may be stored in the auxiliary storage unit 303.

The communication unit 304 transmits/receives information between an external apparatus and the server apparatus 300. The communication unit 304 is, for example, a LAN (Local Area Network) interface board or a wireless communication circuit for wireless communication. The LAN interface board or wireless communication circuit is connected to a network N1.

A series of processes executed by the server apparatus 300 configured as described above may be executed by hardware or may also executed by software.

Next, the user terminal 200 is a small computer that can be carried by the user such as a smartphone, a mobile phone, a tablet terminal, a personal information terminal, a wearable computer (smart watch or the like). Note that the user terminal 200 may also be a personal computer (PC) connected to the server apparatus 300 via the network N1 such as the Internet which is a public communication network.

The user terminal 200 includes a processor 201, a main storage unit 202, an auxiliary storage unit 203, a display unit 204, an input unit 205, a position acquisition unit 206 and a communication unit 207. Since the processor 201, the main storage unit 202 and the auxiliary storage unit 203 are similar to the processor 301, the main storage unit 302 and the auxiliary storage unit 303 of the server apparatus 300, description thereof is omitted. The display unit 204 is, for example, an LCD (Liquid Crystal Display) or an EL (Electroluminescence) panel. The input unit 205 includes, for example, a touch panel that allows symbols such as characters to be inputted, push buttons, a microphone that avows voice to be inputted or a camera that allows a moving image or still image to be picked up. The position acquisition unit 206 is a device that acquires a current position of the user terminal 200 and is typically constructed by including a GPS receiver or the like. The communication unit 207 is a communication circuit for accessing the network N1 using, for example, a mobile communication service (telephone communication network such as a mobile phone or wireless communication of WiFi or the like) and carrying out data communication with the server apparatus 300 or the like.

(Functional Configuration of Server Apparatus)

Here, a functional configuration of the server apparatus 300 will be described based on FIG. 4. As illustrated in FIG. 4, the server apparatus 300 of the present embodiment includes a matching processing unit F310, warning generation unit F320, a reservation management database D330 and a member information management database D340 as functional components thereof. Here, the matching processing unit F310 and the warning generation unit F320 are formed by the processor 301 of the server apparatus 300 executing a computer program in the main storage unit 302. Note that any one or part of the matching processing unit F310 and the warning generation unit F320 may be formed of a hardware circuit.

The reservation management database D330 and a member information management database D340 are constructed by a program of a database management system (DBMS) executed by the processor 301 of the server apparatus 300 managing data stored in the auxiliary storage unit 303. These reservation management database D330 and member information management database D340 are, for example, relational databases.

Note that any one or part of processing thereof of the respective functional components of the server apparatus 300 may be executed by another computer connected to the network N1. For example, each process included in the matching processing unit F310 and each process included in the warning generation unit F320 may be executed by different computers.

The reservation management database D330 stores reservation information for a ride-sharing service, where information relating to the driver user is associated with information relating to a fellow passenger user scheduled to share the vehicle 10 driven by the driver user. Here, one configuration example of reservation information stored in the reservation management database D330 will be described based on FIG. 5. FIG. 5 is a diagram illustrating a table configuration of reservation information. Note that information registered in the reservation information table is not limited to the example shown in FIG. 5, but fields can be added, changed or deleted as appropriate.

The reservation information table shown in FIG. 5 includes fields such as a reservation ID, a driver user ID, a vehicle information, a fellow passenger user ID, a getting-on spot, a scheduled getting-on date and time, a getting-off spot, a scheduled getting-off date and time, a scheduled traveling route and a status. A reservation ID which is information for identifying individual reservation information is registered in the reservation ID field. For example, this reservation ID is used when each user confirms or changes reservation contents. A user ID of a driver user driving the vehicle 10 that can be shared is registered in the driver user ID field, information necessary for a fellow passenger user who shares the vehicle 10 to identify the vehicle 10 driven by each driver user is registered in the vehicle information field. For example, information such as vehicle model, automobile registration number (number displayed on the number plate), vehicle body color or the like is registered in the vehicle information field. A user ID of a fellow passenger user scheduled to share the vehicle 10 driven by each driver user is registered in the fellow passenger user ID field, information indicating a place where a fellow passenger user is allowed to get on the vehicle 10 driven by each driver user (getting-on spot) is registered in the getting-on spot field. Information indicating a scheduled date and time at which a fellow passenger user is allowed to get on the vehicle 10 driven by each driver user at the above getting-on spot is registered in the scheduled getting-on date and time field. Information indicating a place where a fellow passenger user is allowed to get off the vehicle 10 driven by each driver user (getting-off spot) is registered in the getting-off spot field. Information indicating a scheduled date and time at which a fellow passenger user is allowed to get off the vehicle 10 driven by each driver user at the above getting-off spot is registered in the scheduled getting-off date and time field. Information indicating a scheduled traveling route along which the vehicle 10 is scheduled to travel from the getting-in spot to the getting-off spot of the fellow user is registered in the scheduled traveling route field. Information indicating a ride sharing situation of each vehicle 10 is registered in the status field. For example, the status is registered as "already got off" when the fellow passenger user has already got off the vehicle 10 at the above getting-off spot, the status is registered as "getting on" when the fellow passenger user is sharing the vehicle 10 and the status is registered as "before getting on" in a stage before the fellow passenger user gets on the vehicle 10.

Note that the reservation information table in FIG. 5 corresponds to a table configuration example when one fellow passenger user shares the vehicle 10 driven by each driver user, but the number of fellow passenger users who share the vehicle 10 driven by each driver user may be two or more. In that case, as shown in FIG. 6, one driver user ID may be associated with information of a plurality of fellow passenger users.

The member information management database D340 stores information on users registered as members in the ride-sharing service (member information). Here, one configuration example of member information stored in the member information management database D340 will be described based on FIG. 7. FIG. 7 is a diagram illustrating a table configuration of member information. Note that information registered in the member information table is not limited to the example shown in FIG. 7, but fields can be added, changed or deleted as appropriate.

The member information table shown in FIG. 7 includes fields such as a user ID, a contact address, an attribute, authentication and a vehicle ID. A user ID assigned when each user applies for member registration for a ride-sharing service is registered in the user ID field. Information indicating a contact address of each user (electronic mail address, telephone number, or the like, including at least an electronic mail address of the user terminal 200 used by each user) is registered in the contact field. Information indicating an attribute of each user (e.g., name, nickname, age, gender, occupation, work place (school), hobby, skill or the like) is registered in the attribute field. Information indicating a password or the like necessary for authentication when the aforementioned request information is registered in the server apparatus 300 or when the aforementioned reservation information is confirmed is registered in the authentication field. A vehicle ID of the vehicle 10 available to each user for ride sharing is registered in the vehicle ID field. Note that, for example, "None" is registered in the vehicle ID field for a user not possessing the vehicle 10 available for ride sharing.

Next, the matching processing unit F310 per a matching process based on request information from a driver user or a fellow passenger user. More specifically, when the server apparatus 300 receives request information transmitted from the first user terminal 200A of the driving user, the matching processing unit F310 generates a traveling schedule (e.g., information including a place of departure, scheduled departure date and time, destination, scheduled arrival date and time) of the vehicle 10 driven by the driving user based on the request information.

When the server apparatus 300 receives the request information transmitted from the second user terminal 200B of the fellow user, the matching processing unit F310 generates a desired movement schedule (e.g., information including a desired getting-in spot, desired getting-in date and time, desired getting-off spot, desired getting-off date and time) of the ride sharing vehicle based on the request information. The matching processing unit F310 compares the traveling schedule of each driving user with the movement schedule of each fellow user and extracts a traveling schedule that matches the movement schedule of each fellow user. Next, the matching processing unit F310 provisionally combines the driver user associated with the extracted traveling schedule and the above fellow passenger user. Once the provisional combination of the driver user and the fellow passenger user is determined through the above procedure, the matching processing unit F310 transmits information indicating ride sharing conditions (e.g., getting-on spot of the fellow passenger user, scheduled getting-on date and time of the fellow passenger user getting-off spot of the fellow passenger user scheduled getting-off date and time of the fellow passenger user, type of the vehicle 10, or the like) to the respective user terminals 200 of the driver user and the fellow passenger user in the above provisional combination. In response to this, when information accepting the above ride sharing conditions are sent back from both user terminals 200 of the driver user and the fellow passenger user, the matching processing unit F310 confirms the above provisional combination as an official combination. Accordingly, the matching processing unit F310 generates a reservation information table as shown in aforementioned FIG. 5 and FIG. 6 based on the above official combination, and stores the generated reservation information table in the reservation management database D330.

Here, the scheduled traveling route registered in the scheduled traveling route field of the reservation information table is a route connecting the getting-in spot of the fellow user who is first to get in the vehicle 10 and the getting-off spot of the fellow user who is last to get off the vehicle 10. When there are a plurality of such routes, the matching processing unit F310 may select a route along which the vehicle 10 is predicted to be able to travel most quickly from the above-described getting-in spot to getting-off spot based on congestion prediction information or traffic regulation information or the like in a time zone in which the vehicle 10 is scheduled to travel and set the selected route as the scheduled traveling route. As another method, the matching processing unit F310 may select a shortest route from among a plurality of routes connecting the getting-in spot of the fellow user who is first to get in the vehicle 10 and the getting-off spot of the fellow user who is last to get off the vehicle 10 and set the selected route as the scheduled traveling route. A selection and setting of a scheduled traveling route in the case where there are a plurality of routes connecting the getting-in spot of the fellow user who is first to get in the vehicle 10 and the getting-off spot of the fellow user who is last to get off the vehicle 10 need not be performed at a point in time at which the reservation information table is generated. That is, the matching processing unit F310 may select a route along which the vehicle 10 can travel most quickly from the above-described getting-in spot to getting-off spot from among the plurality of routes based on congestion information or traffic regulation information or the like immediately before the scheduled getting-in date and time of the fellow user who is first to get in the vehicle 10 and set the selected route as the scheduled traveling route.

Note that the method for executing the matching process by the matching processing unit F310 is not limited to the above method, but the matching process may be executed using other methods using known techniques.

When the actual traveling route of the vehicle 10 is deviated from the above-described scheduled traveling route, the warning generation unit F320 generates warning information and transmits the generated warning information to the first user terminal 200A and the second user terminal 200B. More specifically, the warning generation unit F320 acquires a current position of the vehicle 10 in which the fellow user is traveling (sharing the same vehicle) and determines whether or not the actual traveling route of the vehicle 10 is deviated from the above-described scheduled traveling route. Here, the current position of the vehicle 10 is acquired by causing the first user terminal 200A or the second user terminal 200B to periodically transmit the current position acquired by the position acquisition unit 206 of the first user terminal 200A or the second user terminal 200B to the server apparatus 300. Note that when a navigation system communicable with the server apparatus 300 is mounted on the vehicle 10, the current position of the vehicle 10 may be acquired by causing the navigation system to periodically transmit the current position detected by the navigation system to the server apparatus 300. When the current position of the vehicle 10 is deviated from the above-described scheduled traveling route, the warning generation unit F320 determines that the actual traveling route of the vehicle 10 is deviated from the scheduled traveling route. In that case, the warning generation unit F320 extracts an electronic mail address of the first user terminal 200A from the member information table of the driving user and also extracts an electronic mail address of the second user terminal 200B from the member information table of the fellow user, and transmits warning information to those electronic mail addresses. The warning information in this example is information warning the users (driving user and the fellow user) sharing the vehicle 10, that the vehicle 10 is traveling off the scheduled traveling route. More specifically, the warning information includes information for notifying the users that the vehicle 10 is traveling off the scheduled traveling route and information asking whether or not the users agree that the vehicle 10 is traveling off the scheduled traveling route.

After the warning information is transmitted from the server apparatus 300 to the first user terminal 200A and the second user terminal 200B, when the server apparatus 300 receives the information indicating that the users agree that the actual traveling route of the vehicle 10 is deviated from the scheduled traveling route from both the first user terminal 200A and the second user terminal 200B, the warning generation unit F320 generates anew scheduled traveling route including the route along which the vehicle 10 is actually traveling. The warning generation unit F320 changes the information registered in the scheduled traveling route field of the reservation information table to the newly generated scheduled traveling route. The warning generation unit F320 transmits information indicating the newly generated scheduled traveling route to the first user terminal 200A and the second user terminal 200B.

On the other hand, after the warning information is transmitted from the server apparatus 300 to the first user terminal 200A and the second user terminal 200B, if the server apparatus 300 fails to receive information indicating that the users agree that the actual traveling route of the vehicle 10 is deviated from the scheduled traveling route from both the first user terminal 200A and the second user terminal 200B, the warning generation unit F320 retransmits the warning information to the first user terminal 200A and the second user terminal 200B to thereby repeatedly warn the users traveling in the vehicle 10 that the vehicle 10 is traveling off the scheduled traveling route.

(Functional Configuration of User Terminal)

FIG. 8 is a diagram illustrating a functional configuration of the user terminal 200. The user terminal 200 is provided with a reservation registration unit F210 and a warning processing unit F220 as functional components. These reservation registration unit F210 and warning processing unit F220 are formed by the processor 201 of the user terminal 200 executing a computer program in the main storage unit 202. Note that any one of the above functional components or part of the processing thereof may be executed by a hardware circuit.

The reservation registration unit F210 receives an input of request information to the input unit 205 from the user and transmits the inputted request information to the server apparatus 300. When information indicating ride sharing conditions in a provisional combination of a driver user and a fellow passenger user is transmitted from the server apparatus 300 to the user terminal 200 in response to the above request information, the reservation registration unit F210 displays information indicating the ride sharing conditions in the provisional combination on the display unit 204. In that case, the reservation registration unit F210 executes a process of urging the user to select whether or not to accept the information indicating the above ride sharing conditions (e.g., process of displaying a button for selecting whether or not accept the ride sharing conditions on the input unit 205 such as a touch panel). When the user selects acceptance of the information indicating the above ride sharing conditions, the reservation registration unit F210 transmits the information indicating the selection result to the server apparatus 300. When such information is transmitted from both the user terminal 200 of the driver user and the user terminal 200 of the fellow passenger user to the server apparatus 300, an official combination of a driver user and a fellow passenger user is confirmed through a matching process in the server apparatus 300 as described above. Accordingly, reservation information corresponding to an official combination of a driver user and a fellow passenger user is transmitted from the server apparatus 300 to the user terminal 200. In that case, the reservation registration unit F210 displays the reservation information on the display unit 204. This allows the user of the user terminal 200 to confirm the reservation information. Note that the above function of the reservation registration unit F210 is implemented by the above predetermined application.

Here, the method for each user to have the above request information registered in the server apparatus 300 is not limited to the method using the user terminal 200. For example, the above request information may also be registered in the server apparatus 300 using an arbitrary terminal connectable to the network N1 (smartphone, mobile phone, tablet terminal, personal information terminal, wearable computer or the like) or a personal computer (PC).

When the warning processing unit F220 receives the warning information transmitted from the server apparatus 300, the warning processing unit F220 causes the display unit 204 to display information notifying the users that the vehicle 10 is traveling off the scheduled traveling route and executes a process of urging the users to select whether or not to agree that the vehicle 10 is traveling off the scheduled traveling route (selection process). The "selection process" referred to here is for example, a process of displaying a screen as illustrated in FIG. 9 on the touch panel 250A provided for the input unit 205. FIG. 9 is an example of the screen for selecting whether or not to agree that the vehicle 10 is traveling off the scheduled traveling route. In the example illustrated in FIG. 9, a button B1 to select to "agree" and a button B2 to select to "disagree" are displayed on the touch panel 250A, and character information for urging the users to select any one of the two buttons and B2 is displayed.

When the user selects the button B1 or B2 from the screen illustrated in FIG. 9, the warning processing unit F220 generates reply information corresponding to the selected button. When, for example, the user selects the button B1, the warning processing unit F220 generates reply information indicating that the user agrees that the vehicle 10 is traveling off the scheduled traveling route. On the other hand, when the user selects the button B2, the warning processing unit F220 generates reply information indicating that the user disagrees that the vehicle 10 is traveling off the scheduled traveling route. The warning processing unit F220 transmits the generated reply information to the server apparatus 300.

Note that when causing the display unit 204 to display the above-described various kinds of information, the warning processing unit F220 may cause a speech output unit such as a speaker mounted on the user terminal 200 to output a warning sound, and can thereby call attention more reliably.

The above function by the Warning processing unit F220 is implemented by the above predetermined application.

(System Operation)

Operation of the ride sharing system in the case where the ride-sharing vehicle 10 is deviated from the scheduled traveling route will be described based on FIG. 10 to FIG. 12. FIG. 10 is a flow diagram illustrating an outline of a flow of data transmitted/received between respective components of a ride sharing system and a flow of processing executed by the respective components. FIG. 11 is a flowchart illustrating operation of the server apparatus 300 when the ride-sharing vehicle 10 is traveling. FIG. 12 is a flowchart illustrating operation of the server apparatus 300 after warning information is transmitted.

In FIG. 10, the server apparatus 300 determines whether or not the ride-sharing vehicle 10 is traveling off the scheduled traveling route (step S11). Upon determining that the ride-sharing vehicle 10 is traveling off the scheduled traveling route, the server apparatus 300 transmits the above-described warning information to the first user terminal 200A and the second user terminal 200B (step S12). These processes are executed based on the processing flow illustrated in FIG. 11. The processing flow illustrated in FIG. 11 is repeatedly executed in a predetermined cycle.

In FIG. 11, the warning generation unit F320 of the server apparatus 300 acquires a current position of the ride-sharing vehicle 10 first (step S101). More specifically, the warning generation unit F320 communicates with the first user terminal 200A used by the driving user or the second user terminal 200B used by the fellow user to thereby acquire the current position of the first user terminal 200A or the second user terminal 200B. Note that when a navigation system communicable with the server apparatus 300 is mounted on the vehicle 10, the warning generation unit F320 may communicate with the navigation system to thereby acquire the current position of the vehicle 10.

When the current position of the vehicle 10 is acquired in step S101, the warning generation unit F320 extracts a scheduled traveling route from the reservation information table illustrated in aforementioned FIG. 5 or 6 and determines whether or not the current position of the vehicle 10 acquired in step S101 is deviated from the scheduled traveling route (step S102). When the current position of the vehicle 10 is not deviated from the scheduled traveling route (negative determination in step S102), the warning generation unit F320 ends the processing flow temporarily. On the other hand, the current position of the vehicle 10 is deviated from the scheduled traveling route (affirmative determination in step S102), the warning generation unit F320 proceeds to step S103.

In step S103, the warning generation unit F320 generates the aforementioned warning information. Next, the warning generation unit F320 accesses the member information table, thereby extracts the electronic mail address of the first user terminal 200A registered in the member information table of the driving user and the electronic mail address of the second user terminal 200B registered in the member information table of the fellow user and transmits warning information to those electronic mail addresses (step S104).

Here, returning to FIG. 10, when the warning information transmitted from the server apparatus 300 is received by the first user terminal 200A and the second user terminal 200B, the warning processing unit F220 of each user terminal 200A or 200B causes the display unit 204 to display information for notifying the user that the vehicle 10 is traveling off the scheduled traveling route and executes a process of urging the user to select whether or not to agree that the vehicle 10 is traveling off the scheduled traveling route (selection process) (step S13). When the user of each user terminal 200A or 200B selects whether or not to agree that the vehicle 10 is traveling off the scheduled traveling route, the warning processing unit F220 generates information indicating the selection result (reply information) and transmits the generated reply information to the server apparatus 300 (step S14).

When the reply information transmitted from each user terminal 200A or 200I is received by the server apparatus 300, the warning generation unit F320 of the server apparatus 300 determines, based on the reply information, whether or not both the driving user and the fellow user agree that the vehicle 10 is traveling off the scheduled traveling route (presence or absence of agreement) (step S15). When both the driving user and the fellow user agree that the vehicle 10 is traveling off the scheduled traveling route, the warning generation unit F320 sets a new scheduled traveling route including the route along which the vehicle 10 is actually traveling and transmits the new set, scheduled traveling route to the first user terminal 200A and the second user terminal 200B. Furthermore, the warning generation unit F320 changes the information registered in the scheduled traveling route field of the reservation information table illustrated in aforementioned FIGS. 5 and 6 to the new scheduled traveling route. On the other hand, when both the driving user and the fellow user do not agree that the vehicle 10 is traveling off the scheduled traveling route, the warning generation unit F320 retransmits the warning information to the first user terminal 200A and the second user terminal 200B (step S16). These processes are executed based on a processing flow illustrated in FIG. 12.

In FIG. 12, the warning generation unit F320 of the server apparatus 300 determines whether or not the server apparatus 300 has received reply information from both the first user terminal 200A and the second user terminal 200E (step S201). When the server apparatus 300 has received the reply information from both the first user terminal 200A and the second user terminal 200B (affirmative determination in step S201), the warning generation unit F320 determines whether or not both the reply information received from the first user terminal 200A and the reply information received from the second user terminal 200B are information indicating that the users agree that the vehicle 10 is traveling off the scheduled traveling route. That is, the warning generation unit F320 determines whether or not both the driving user and the fellow user agree that the vehicle 10 is traveling off the scheduled traveling route (step S202).

Here, if both the driving user and the fellow user agree that the vehicle 10 is traveling off the scheduled traveling route (affirmative determination in step S202), the warning generation unit F320 sets a new scheduled traveling route including the actual traveling route of the vehicle 10 and changes the information registered in the scheduled traveling route field of the reservation information table to the new scheduled traveling route (step S203). Next, the warning generation unit F320 transmits the new scheduled traveling route set in step S203 to the first user terminal 200A and the second user terminal 200B (step S204).

On the other hand, when both the driving user and the fellow user do not agree that the vehicle 10 is traveling off the scheduled traveling route (negative determination in step S202), there is a possibility that one of the driving user and the fellow user may have been compelled by the other to cause the vehicle 10 to be deviated from the scheduled traveling route, and so the warning generation unit F320 retransmits the warning information to both the first user terminal 200A and the second user terminal 200B (step S205). Note that when the server apparatus 300 fails to receive reply information from both the first user terminal 200A and the second user terminal 200B (negative determination in step S201), there is also a possibility that any one of the driving user and the fellow user may have been compelled by the other to cause the vehicle 10 to be deviated from the scheduled traveling route, and so the warning generation unit F320 retransmits the warning information to both the first user terminal 200A and the second user terminal 200B in the same way as in the case of step S202 where a negative determination is made.

Note that in the case where a warning apparatus communicable with the server apparatus 300 is mounted on the vehicle 10, the warning generation unit F320 may cause the warning apparatus to operate when a negative determination is made in step S201 or step S202. For example, an apparatus that generates warning sound toward the inside or outside the vehicle or an apparatus that turns on a warning lamp toward the inside or outside of the vehicle may be used as the warning apparatus referred to here.

According to the aforementioned processing flow, when the ride-sharing vehicle 10 is traveling off the scheduled traveling route, the server apparatus 300 transmits warning information to the first user terminal 200A and the second user terminal 200B, and it is thereby possible to warn both the driving user and the fellow user that the vehicle is traveling off a scheduled traveling route. Thus, even when the vehicle is deviated from the scheduled traveling route because one of the driving user and the fellow user is compelled by the other, it is possible to contribute to securing of security of the compelled user. As a result, it is possible to relieve anxiety of the user who hesitates to use ride sharing from the standpoint of safety. Furthermore, in the case where the vehicle is deviated from the scheduled traveling route after both the driving user and the fellow user agree with the deviation, for example, for the purpose of avoiding congestion, the scheduled traveling route may be changed, and it is thereby possible to prevent excessive warning and prevent the driving user or the fellow user from feeling troublesomeness.

Modification

Next, a modification of the aforementioned embodiment will be described. Note that detailed description of components substantially identical to those of the first embodiment or control processing substantially identical to that will be omitted in the present modification.

A case has been described in the aforementioned embodiment where when the vehicle 10 is traveling off the Scheduled traveling route, the server apparatus 300 transmits warning information to the first user terminal 200A and the second user terminal 200B irrespective of the number of fellow users. In contrast, a case will be described in the present modification where when the vehicle 10 is traveling off the scheduled traveling route, the server apparatus 300 transmits warning information to the first user terminal 200A and the second user terminal 200B when the number of fellow users is one, whereas the server apparatus 300 does not transmit warning information to the first user terminal 200A and the second user terminal 200B when the number of fellow users is plural.

Here, when one fellow user is in the same vehicle 10, the user is, more likely to feel anxiety about safety than in a case where a plurality of fellow users are in the same vehicle 10. Especially when the vehicle 10 is deviated from the scheduled traveling route at the driving user's discretion, a plurality of fellow users may be able to more easily urge the driving user to return to the original scheduled traveling route, whereas it may be more difficult for one fellow user to urge the driving user to return to the original scheduled traveling route.

Thus, in the present modification, when the ride-sharing vehicle 10 is traveling off the scheduled traveling route, the server apparatus 300 is caused to operate according to a processing flow illustrated in FIG. 13. The processing flow illustrated in FIG. 13 is a flowchart illustrating operation of the server apparatus 300 when the ride-sharing vehicle 10 is traveling. In FIG. 13, processes similar to those in aforementioned FIG. 11 are assigned identical reference numerals.

In the flow in FIG. 13, when an affirmative determination is made in step S102, a process in S1020 is executed before step S103. In step S1020, the warning generation unit F320 of the server apparatus 300 determines whether or not the number of fellow users sharing the vehicle 10 is one. More specifically, the warning generation unit F320 determines whether or not the number of fellow users registered in the status field as "in vehicle" of the reservation information table illustrated in aforementioned FIG. 6 is one. When the number of fellow users registered in the status field as "in vehicle" of the reservation information table is plural (negative determination in step S1020), the warning generation unit F320 ends the present processing flow temporarily. On the other hand, when the number of fellow users registered in the status field as "in vehicle" of the reservation information table is one (affirmative determination in step S1020), the warning generation unit F320 executes processes in and after step S103.

According to the aforementioned modification, exclusively when the user is likely to feel anxiety about safety as in the case where the number of fellow users sharing the vehicle 10 is one, the server apparatus 300 transmits warning information to the first user terminal 200A and the second user terminal 200B. In other words, when the user is less likely to feel anxiety about safety as in the case where the number of fellow users sharing the vehicle 10 is plural, the server apparatus 300 does not transmit warning information to the first user terminal 200A and the second user terminal 200B, thus preventing the users from feeling troublesomeness.

Others

The above embodiments are merely examples and the present disclosure ran be changed and implemented as appropriate without departing from the spirit and scope of range of the present disclosure.

The processes and configurations described in the present disclosure may be freely combined and implemented unless there are technical inconsistencies. A process described as being performed by one device may be shared and executed among a plurality of devices. Alternatively, processes described as being executed by different devices may be executed by one device. In a computer system, it is possible to flexibly change a hardware configuration used to implement each function.

Furthermore, the present disclosure can also be implemented by supplying a computer program including the functions described in the above embodiments to a computer and by one or more processors included in the computer reading and executing the program. Such a computer program may be supplied to the computer through a non-transitory computer readable storage medium which is connectable to a system bus of the computer or may be supplied to the computer via a network. The non-transitory computer readable storage medium is a storage medium which allows information such as data or a program to be stored through electrical, magnetic, optical, mechanical or chemical action and read from the computer or the like, and examples of such a medium include any type of disk such as magnetic disk (floppy (registered trademark) disk, hard disk drive (HDD) or the like), optical disk (CD-ROM, DVD disk, blue-ray disk or the like), read-only memory (ROM), random access memory CRAW EPROM, EEPROM, magnetic card, flash memory, optical card and SSD (Solid State Drive).

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus in a mode in which a plurality of users share a same vehicle, the information processing apparatus comprising a controller including at least one processor,
   the controller configured to execute:
   setting, when a combination of a driving user who drives the vehicle and at least one fellow user who rides in the same vehicle is determined, a scheduled traveling route, which is a route along which the vehicle is scheduled to travel from a getting-in spot to a getting-off spot of the at least one fellow user; and
   determining, upon detecting that the vehicle is traveling off the scheduled traveling route, whether or not the at least one fellow user sharing the vehicle is exactly one fellow user;
   transmitting, when the at least one fellow user sharing the vehicle is determined to be exactly one fellow user, warning information which is information warning a first user terminal and a second user terminal that the vehicle is traveling off the scheduled traveling route, the first user terminal being a terminal used by the driving user and the second user terminal being a terminal used by the at least one fellow user; and
   not transmitting, when a number of the at least one fellow user is determined to be not exactly one fellow user, the warning information to the first user terminal and to the second user terminal.

2. The information processing apparatus according to claim 1, wherein
   the warning information includes information asking whether or not to agree that the vehicle is traveling off the scheduled traveling route, and
   upon receiving information indicating an agreement that the vehicle is traveling off the scheduled traveling route from both the first user terminal and the second user terminal, the controller resets a new scheduled traveling route including a route along which the vehicle is actually traveling and transmits the reset new scheduled traveling route to the first user terminal and the second user terminal.

3. The information processing apparatus according to claim 2, wherein when the controller fails to receive the information indicating an agreement that the vehicle is traveling off the scheduled traveling route from both the first user terminal and the second user terminal, the controller retransmits the warning information to the first user terminal and the second user terminal.

4. The information processing apparatus according to claim 1, wherein
   the warning information includes information asking whether or not to agree that the vehicle is traveling off the scheduled traveling route, and
   upon receiving information indicating an agreement that the vehicle is traveling off the scheduled traveling route from both the first user terminal and the second user terminal, the controller resets a new scheduled traveling route including a route along which the vehicle is actually traveling and transmits the reset new scheduled traveling route to the first user terminal and the second user terminal.

5. The information processing apparatus according to claim 4, wherein when the controller fails to receive the information indicating an agreement that the vehicle is traveling off the scheduled traveling route from both the first user terminal and the second user terminal, the controller retransmits the warning information to the first user terminal and the second user terminal.

6. An information processing method in a mode in which a plurality of users share a same vehicle, the information processing method causing a computer to execute:
   a step of setting, when a combination of a driving user who drives the vehicle and at least one fellow user who rides in the same vehicle is determined, a scheduled traveling route, which is a route along which the vehicle is scheduled to travel from a getting-in spot to a getting-off spot of the at least one fellow user; and
   a step of determining, upon detecting that the vehicle is traveling off the scheduled traveling route, whether or not the at least one fellow user sharing the vehicle is exactly one fellow user;
   a step of transmitting, when the at least one fellow user sharing the vehicle is determined to be exactly one fellow user, warning information which is information warning a first user terminal and a second user terminal that the vehicle is traveling off the scheduled traveling route, the first user terminal being a terminal used by the driving user and the second user terminal being a terminal used by the at least one fellow user; and
   a step of not transmitting, when a number of the at least one fellow user is determined to be not exactly one fellow user, the warning information to the first user terminal and to the second user terminal.

7. A non-transitory storage medium stored with an information processing program in a mode in which a plurality of users share a same vehicle, the information processing program causing a computer to execute:
   a step of setting, when a combination of a driving user who drives the vehicle and at least one fellow user who rides in the same vehicle is determined, a scheduled traveling route, which is a route along which the vehicle is scheduled to travel from a getting-in spot to a getting-off spot of the at least one fellow user; and
   a step of determining, upon detecting that the vehicle is traveling off the scheduled traveling route, whether or not the at least one fellow user sharing the vehicle is exactly one fellow user;
   a step of transmitting, when the at least one fellow user sharing the vehicle is determined to be exactly one fellow user, warning information which is information warning a first user terminal and a second user terminal that the vehicle is traveling off the scheduled traveling route, the first user terminal being a terminal used by the driving user and the second user terminal being a terminal used by the at least one fellow user; and a step of not transmitting, when a number of the at least one fellow user is determined to be not exactly one fellow user, the warning information to the first user terminal and to the second user terminal.

* * * * *